United States Patent [19]

Jemison et al.

[11] 4,000,875
[45] Jan. 4, 1977

[54] ONE-PIECE STRAIN RELIEF BUSHING WITH INDEPENDENT HOLDING MEANS

[75] Inventors: William Jemison, Summit; Salvatore Orlando, Rahway; Richard Fink, Basking Ridge, all of N.J.

[73] Assignee: Heyman Manufacturing Company, Kenilworth, N.J.

[22] Filed: May 9, 1975

[21] Appl. No.: 574,621

Related U.S. Application Data

[63] Continuation-in-part of Ser. No. 477,780, June 11, 1974.

[52] U.S. Cl. .............................. 248/56; 174/153 G; 339/103 B
[51] Int. Cl.² ......................................... H01R 13/58
[58] Field of Search ............... 248/56, 74 R, 74 PB; 174/65 G, 152 G, 153 G; 16/2; 339/103 B, 126 RS

[56] References Cited

UNITED STATES PATENTS

| | | | |
|---|---|---|---|
| 2,828,147 | 3/1958 | Peiffer | 248/56 X |
| 3,118,644 | 1/1964 | Wernig | 248/74 PB X |
| 3,126,185 | 3/1964 | Christman | 248/74 R |
| 3,127,471 | 3/1964 | Greiner | 174/65 G X |
| 3,167,292 | 1/1965 | Meyerowitz | 248/56 X |
| 3,169,004 | 2/1965 | Rapata | 248/74 PB X |
| 3,493,205 | 2/1970 | Bromberg | 248/56 |
| 3,498,575 | 3/1970 | Downing | 248/74 R X |
| 3,643,290 | 2/1972 | Milne | 248/56 X |
| 3,689,014 | 9/1972 | Fink | 248/56 |
| 3,701,505 | 10/1972 | Krumpp | 248/56 |
| 3,788,582 | 1/1974 | Swanguist | 248/56 |

FOREIGN PATENTS OR APPLICATIONS 1,952,081   5/1966   Germany

*Primary Examiner*—James T. McCall
*Assistant Examiner*—Rodney H. Bonck
*Attorney, Agent, or Firm*—Auslander & Thomas

[57] ABSTRACT

A one-piece strain relief bushing includes independent means for grasping the wall surrounding an aperture and open and closeable means for grasping a cord or cable so as to relieve strain while being able to release the cord or cable without having to detach the strain relief bushing from its position in the aperture.

10 Claims, 13 Drawing Figures

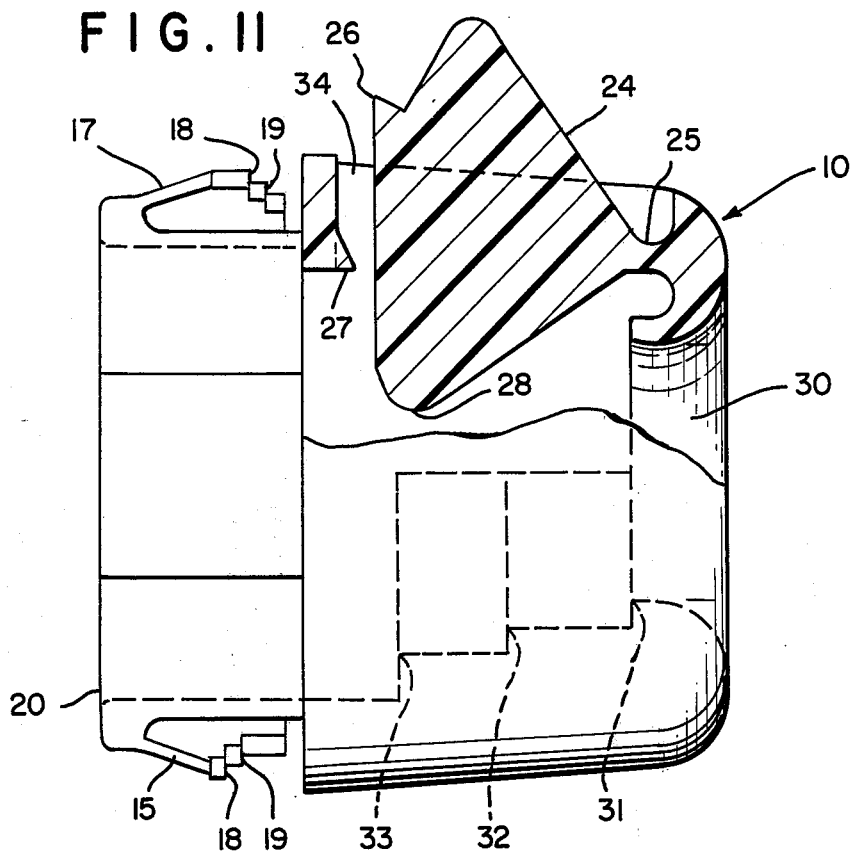
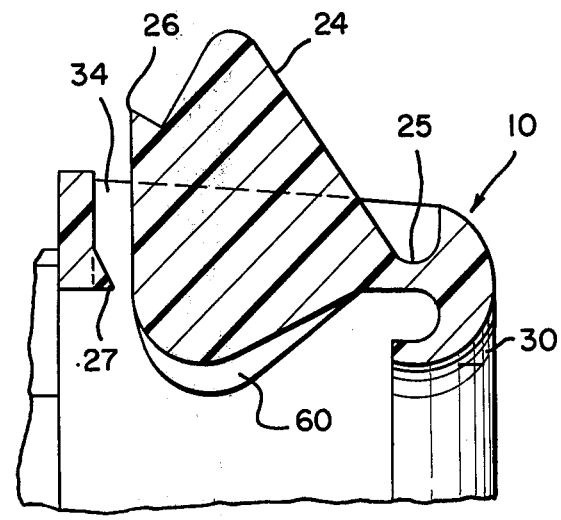
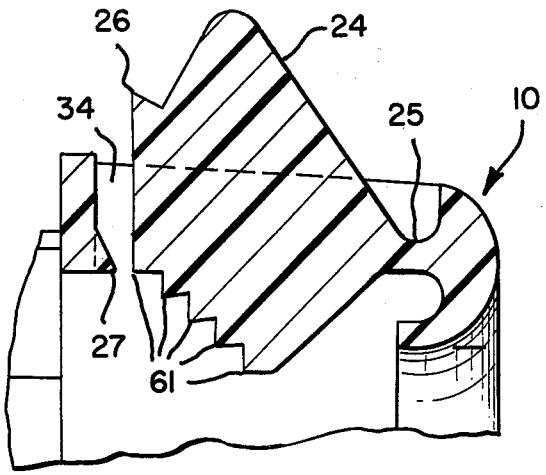

ONE-PIECE STRAIN RELIEF BUSHING WITH INDEPENDENT HOLDING MEANS

This application is a continuation in part of U.S. patent application entitled ONE-PIECE STRAIN RELIEF BUSHING WITH INDEPENDENT HOLDING MEANS filed June 11, 1974, Ser. No. 477,780 in Art Unit 212 of the U.S. Patent and Trade Mark Office.

The present invention relates to a strain relief bushing for an electric cable or cord. The strain relief bushing has a part fixable in an aperture or chassis opening independent of the strain relief means in the bushing. The strain relief means is openable without special purpose tools.

It is often desirable to have a strain relief bushing which is not only secure in an aperture, but also may allow removal and/or replacement of the cable or cord while the strain relief bushing is secure against loss.

In the past, securing of the strain relief bushing has been effected one way, by having a screw or similar device pass through a special portion of the strain relief bushing to attach the bushing to the wall or an opening in a chassis with an aperture. In such case, a separate opening or aperture in such wall or chassis held the strain relief bushing in the aperture. Such securing means was other than the strain relief means of the bushing.

Where a strain relief bushing used a single aperture, integral or attachable securing devices, often T shaped, have been provided. These securing devices held the strain relief bushing at the single aperture. The cross on the T in such case was larger than the aperture.

Although screw fit or snap fit strain relief devices have been employed, which can be independently secured in an aperture while cable or cord is being replaced, such devices were either not easily opened or not one piece. This holds true even where such devices of the past had a protective shield interposed between the impinging means of the strain relief bushing and the cable or cord.

According to the present invention a one-piece strain bushing is provided for strain relief for an electric cable or cord removably locked in the strain relief bushing. The cable or cord may optionally be removed with ordinary tools while the strain relief device is still locked in the aperture or opening in a chassis. The strain relief device requires only one aperture in an appliance or chassis for full functioning. Cable or cord are engaged in the strain relief device and held by pressure, forcing the cable or cord against a sharp corner of the strain relief bushings or some friction surface. The cam, which acts to provide the holding pressure for the cable or cord may be made to bear on another surface interposed between the cable or cord and the cam itself, for protection of the cable or cord from abrasion, if desired or necessary.

It is advantageous to have the strain relief bushing of the present invention in one piece. A one-piece bushing may be made in a single molding operation. Separate parts need not be inventoried and the bushing in hand is always ready for use. The expense of screws and metal parts and the expense of labor for installation or removal of a cable or cord is all saved. There is even saving of labor over plastic screws and prior plastic devices. The strain relief bushing is also adaptable to receive a selection of cable or cord sized, or a plurality of cables or cords obviating the need for many different strain relief bushings sizes.

Although such novel feature or features believed to be characteristic of the invention are pointed out in the claims, the invention and the manner in which it may be carried out, may be further understood by reference to the description following and the accompanying drawings.

FIG. 11 is a partially cut away elevation of a strain relief bushing of the present invention.

FIG. 12 is a cut away detail of a variant strain relief bushing of FIG. 11.

FIG. 13 is a cut away detail of another variant strain relief bushing of FIG. 11.

Referring now to the figures in greater detail, where like reference numbers denote like parts in the various figures.

Figure 3:
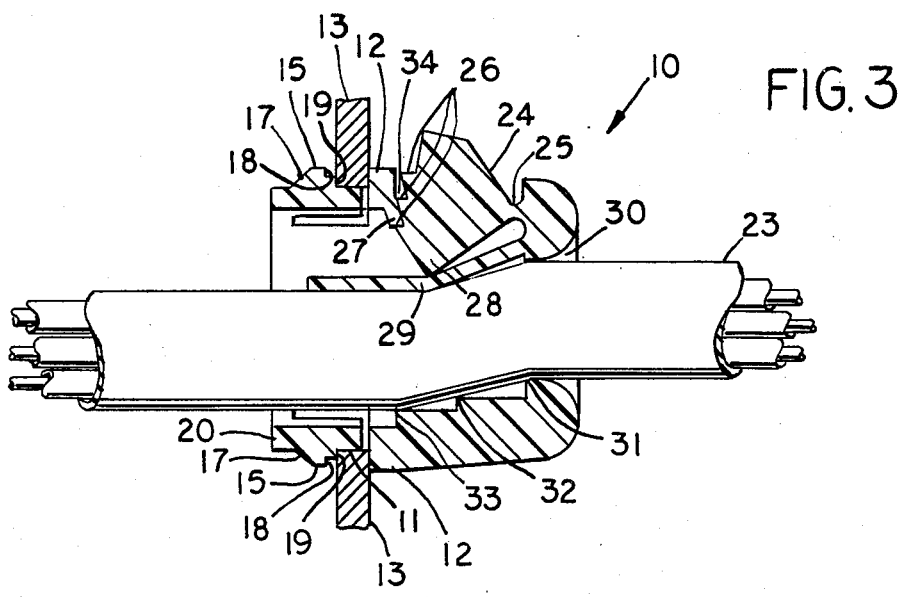
FIG. 3 is a vertical section of the strain relief bushing of FIGS. 1 and 2.
Figure 1:
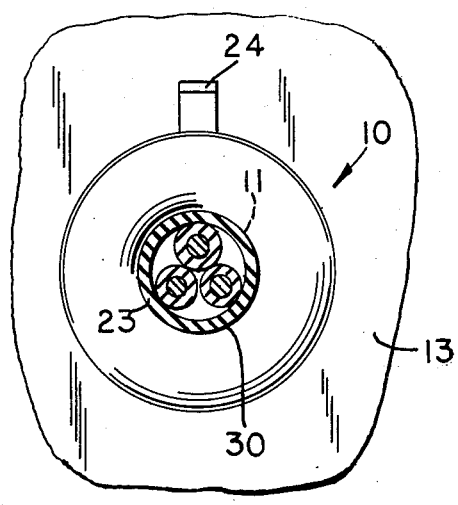
FIG. 1 is a front elevation of a strain relief bushing of the present invention in an aperture in a wall.
Figure 2:
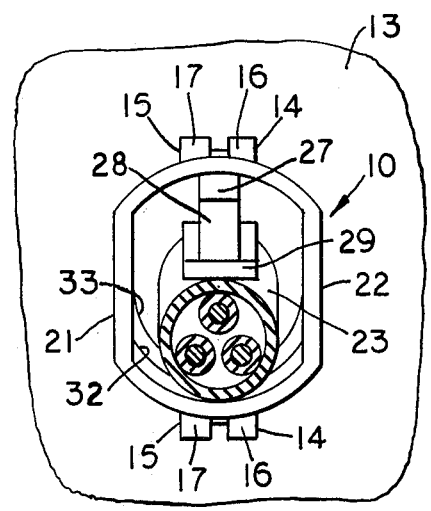
FIG. 2 is a rear elevation of FIG. 1 on the opposite side of the wall.

The strain relief bushing 10 as shown in FIGS. 1 – 3 has conventional aperture locking means to lock the strain relief bushing 10 into an aperture 11. A preferably circular flange portion 12, wider than the opening of the aperture 11 abuts one side of the wall 13.

As shown in FIGS. 2 and 3, fingers 14, 15 with ramps 16, 17 and shoulders 18, 19 extend from the collar 20 of the strain relief bushing 10. the collar 20 is just a trifle smaller than the aperture 11. The collar 20 preferably has flat sides 21, 22 so that when fit into a flat-sided aperture 11 rotation of the strain relief bushing 10 will be prevented.

The fingers 14, 15 move from their point of attachment on the collar 20 as the wall 13 of the aperture 11 slides up the ramps 16, 17 until the wall 13 of the aperture 11 becomes engaged between the flange portion 12 and the shoulders 17, 18 on the fingers 14, 15 thus independently holding the strain relief bushing 10 in the aperture 11.

The cable 23 is passed through the strain relief bushing 10. The cam 24 on the strain relief bushing 10 is situated in an aperture extending into the body of said bushing 10 from its periphery. The aperture opens into the cable receiving opening and is held by a hinge 25 integral to the strain relief bushing 10 at an edge of said aperture.

The cam 24 includes several grips 26 which interact to lock with a pawl 27 to lock the cam 24 in position when depressed.

The cam 24 includes a protrusion 28 that, as can be seen in FIG. 3, may impinge upon a shield 29 integral to the strain relief bushing 10. The shield 29 forms a barrier between the cable 23 and the cam 24 to protect the cable 23 against abrasion.

The cable 23, as can be seen in FIG. 3, is pushed away from a centerline (unmarked) of the front opening 30 of the strain relief bushing 10 and pressed against the sharp ridges 31, 32, 33 inside the strain relief bushing 10 apposed to said protrusion 28 held in strain relief engagement, either with or without the shield 29 interposed.

The cam 24 with a grip 26 engaging the pawl 27, preferably leaves a gap 34 into which a conventional tool (not shown) may be interposed to effect release or unlock the engaged cam 24 and release the cable 23 from its strain relief position.

Figure 4:
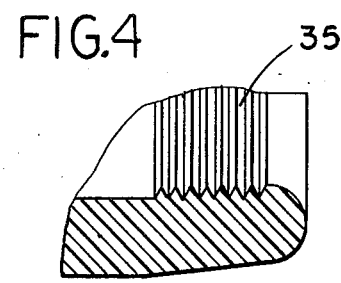
FIG. 4 is a detail of an alternate friction surface inside a strain relief bushing of the present invention.

In FIG. 4 a detail is shown of a typical friction means 35 such as serrations, substitutable for the ridges 32, 32, 33, in order to hold the cable from slipping, once the cam 24 has been locked at the pawl 27. Other friction means known in the art (not shown) are also adaptable for the purposes of the strain relief bushing 10 of the present invention.

Figure 5:
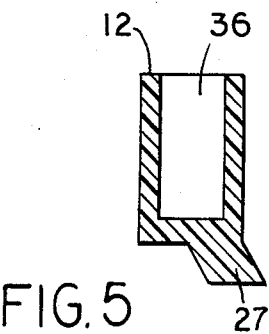
FIG. 5 is a detail section of an alternate pawl construction in the strain relief bushing of the present invention.

For greater ease in the optional release of the engaged cam 24, a hollow 36 may be provided, as shown in FIG. 5 in the body of the strain relief bushing 10 between the flange portion 12 and the gap 34. A conventional tool (not shown) may be insertable into the gap 36 to release the pawl 27 from the grips 26. A conventional tool also may be inserted into the gap 34 and find less resistance against opening the engaged cam 24 since the strain relief bushing 10 will be flexible at the hollow and allow easier release of the cam 24.

Figure 6:
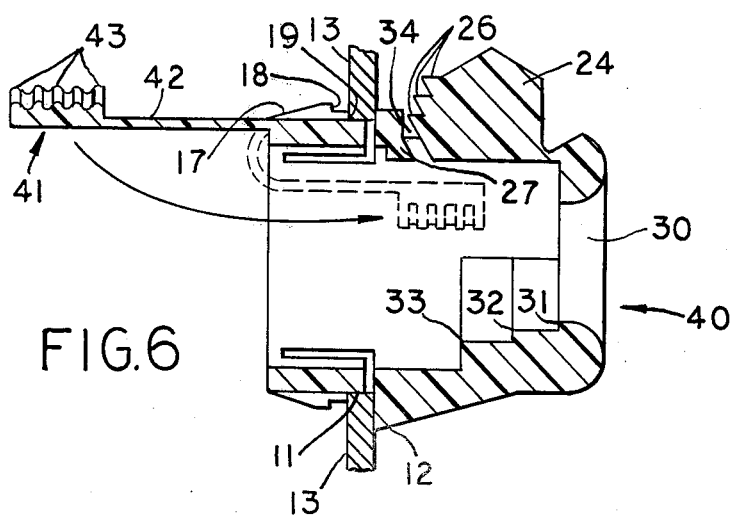
FIG. 6 is a vertical section of another embodiment of the strain relief bushing of the present invention.

Another embodiment of the present invention is shown in FIG. 6. The strain relief bushing 40 is locked into the aperture 11 in the same manner as set forth in FIG. 3 and heretofore described. The cam 24 and pawl 27 with the strain relief bushing's 40 friction ridges 31, 32, 33 engage a cable 23 (not shown).

An alternate protection of the cable against abrasion is disclosed, effected by the interposition of a grip block 41 on a strap 42. The grip block 41, as indicated by the dotted lines, is swung into position between the cable 23 (not shown) and the cam 24. The ridges 43 on the grip block act as a friction surface to help hold the cable 23 (not shown).

Figure 7:
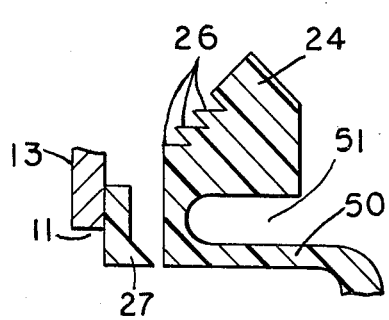
FIG. 7 is a detail section of an alternate camming device of the present invention.

Another embodiment of the cam 24 is shown in FIG. 7. The cam 24 is integral to an elongated web 50. A hollow 51 spaces the web 50 apart from the cam 24, thus facilitating the opening of the locked cam 24. The cam 24 may be depressed into the hollow 51 and moved backward to disengage the grips 26 and pawl 27 in order to release the cam 24, generally without use of any tools.

Figure 9:
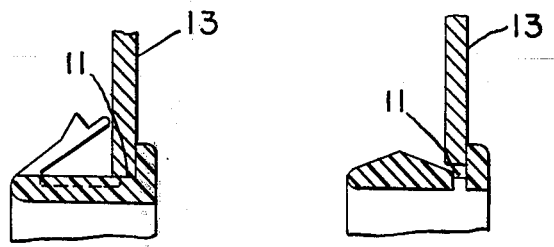
FIGS. 8 through 10 are detail vertical sections of operational wall grasping means of the strain relief bushing of the present invention.
Figure 8:
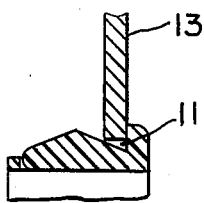
Figure 10:
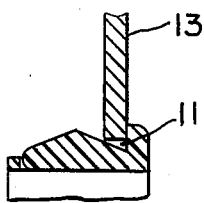

FIGS. 8 – 10 are details of optional wall 13 engaging configuration for locking a strain relief bushing 10, 40 of the present invention in an aperture 11.

The strain relief bushing 10, 40 is preferably made of a hard dielectric plastic. The configuration of the protrusion 28 though, is usually smooth and in itself non-abrasive. Thus, in the embodiments of the strain relief bushing 10 as shown in FIGS. 11 –13 the cam 24 is shown in position to bear directly up a cable 23 (not shown) and the effect is strain relief function without the interposition of the abrasion shield 29 of FIG. 3 or grip block 42 of FIG. 6.

With the cam 24, as shown in FIG. 11, depressed with its grip 26 engaged with the pawl 27, there is adequate locking to hold the cam 24 firmly in place until released and sufficient impingement of the protrusion 28 on a cable 23 to hold the cable 23 in strain relief engagement, even without the abrasion shield 29 or grip block 41 in the manner shown in FIG. 3 or FIG. 6. As shown in detail in FIG. 12, the cam 24 can be seen to have a contour 60 which may straddle a cable 23 to enhance the strain relief grip on the cable 23.

By the same token, the cam 24 as shown in FIG. 13 may be provided with ridges 61 to improve the grip of the cam 24 on the cable 23.

The protrusion configurations 28, 60, 61 on the cam 24 as shown in FIGS. 11 – 13 are exemplary since a large variety of configurations may be used to effect proper gripping without any major danger of abrading the cable 23.

In use a cable 23 or cord may be passed through the opening 30 of the strain relief bushing 10, 40, either before or after the strain relief bushing 10, 40 is engaged in an aperture 11. Once engaged in an aperture 11, as shown in FIGS. 3 and 6, or in detail in FIGS. 8 – 10, the strain relief bushing 10, 40 is firmly held in the aperture 11 irrespective of the status of the cable 23.

The cable 23 is engaged in the strain relief bushing 10, 40 by depressing the cam 24. The grips 26 of the cam 24 catch in the pawl 27 while the shield 29 or grip block 41 engage the cable 23. The cable 23 is thus when desired, protected from abrasion by the shield 29 or grip block 41. At the same time, the cam 24 forces the cable 23 off its straight plane and engages it against the ridges 31, 32, 33 or the friction means 35 as shown in FIGS. 4.

The engaged cable 23 is held firmly in the strain relief bushing 10, 40. Any strain on the cable 23 first registers on the strain relief bushing 10, 40 between the protrusion 28 of the cam 24 or the grip block 41 or the contours 60, 61 and the ridges 31, 32, 33 or friction means 35, thus protecting the cable 23 from harmful strain.

The use of a hollow 51 between the cam 24 and the web 50 helps effect a tooless opening of a strain relief bushing 10, 40 when used therewith. A backward push of the cam 24 helps disengage the grip 26 from the pawl 27 as the hollow 51 is narrowed by such movement. The end of the hollow 51 near the end of the web 50 inside the cam 24 acts as a hinge having a different radius than that of the cam 24 hinging on the web 50 to lock a cable 23 in the strain relief bushing 10, 40.

The terms and expressions which are employed are used as terms of description; it is recognized, though, that various modifications are possible.

Having thus described certain forms of the invention in some detail, what is claimed is:

1. A one-piece strain relief bushing including means independent of its strain relief function to hold itself locked in an aperture, said strain relief bushing including an opening therethrough through which a cable may be received, and an aperture extending into said bushing from the circumference of its body, said aperture opening into said cable receiving opening, a cam having a locked and unlocked position, said cam extendable through said aperture into the body of said bushing and into said cable opening, said cam including a hinge at one portion of said cam on said body of said bushing and at an edge of said aperture, said cam further including means to grip at another portion of said cam, means in said bushing to engage said cam's means to grip and to hold said cam locked in position in said cable opening.

2. The invention of claim 1 wherein said cam hinge is integral to a web and spaced apart from said cam by a hollow.

3. The invention of claim 1 wherein said means to engage said cam's means to grip is a pawl.

4. The invention of claim 3 including a hollow adjacent said pawl said hollow adapted to receive an opening tool.

5. The invention of claim 1 including ridge means in said bushing opposite said cam to hold a cable.

6. The invention of claim 1 including serration means in said bushing opposite said cam to hold a cable.

7. The invention of claim 1 including a gap between said cam's means to grip and said bushing body when said cam is locked, said gap adapted to receive an opening tool.

8. The invention of claim 1 including means to prevent abrasion interposed between said cam and a cable when said cam is in said locked position with a cable in said strain relief bushing.

9. The invention of claim 8 wherein said means to prevent abrasion is a shield.

10. The invention of claim 8 wherein said means to prevent abrasion is a grip block.

* * * * *